United States Patent [19]
Schmid et al.

[11] Patent Number: 5,864,007
[45] Date of Patent: Jan. 26, 1999

[54] LIQUID SYSTEM FOR EXECUTING AN ANIONIC LACTAM POLYMERIZATION

[75] Inventors: Eduard Schmid, Valbeuna, Switzerland; Roman Eder, Filderstadt, Germany

[73] Assignee: EMS-Inventa AG, Zürich, Switzerland

[21] Appl. No.: 786,718

[22] Filed: Jan. 21, 1997

[30] Foreign Application Priority Data

Jan. 25, 1996 [DE] Germany .................. 196 02 684.9

[51] Int. Cl.⁶ .................................................. C08G 69/14
[52] U.S. Cl. .......................... 528/323; 528/312; 528/315; 528/318; 528/322; 528/354
[58] Field of Search ................................ 528/318, 312, 528/315, 322, 323, 354

[56] References Cited

U.S. PATENT DOCUMENTS 3,017,391  1/1962  Mottus et al. .
3,575,938  4/1971  Tierney .

*Primary Examiner*—Duc Truong
*Attorney, Agent, or Firm*—Browdy and Neimark

[57] ABSTRACT

A liquid system for executing the anionic lactam polymerization is proposed, which contains activator as well as catalyst and selectively additives and which is liquid at room temperature and remains stable when stored.

30 Claims, No Drawings

LIQUID SYSTEM FOR EXECUTING AN ANIONIC LACTAM POLYMERIZATION

FIELD OF THE INVENTION

The instant invention relates to a liquid system for executing the anionic lactam polymerization, and to the use of the liquid system for executing the anionic polymerization of lactam.

Background of the Invention

In accordance with the relevant prior art, polyamides are mainly produced in accordance with the method of so-called hydrolytic polymerization from molten lactams at temperatures of approximately 200° to 320° C., wherein often a pressure phase with the addition of water is interposed ahead for opening the ring of the lactam. This reaction proceeds slowly. The reaction product, preferably a granular material, is converted to useful articles in a subsequent step, for example by means of an injection molding or extrusion process.

Strong bases which, for example, can lead to the formation of metal lactamate, can also cause the conversion of lactam to polyamide. The corresponding polymerization reaction proceeds slowly and was replaced by the activated anionic lactam polymerization, wherein the reaction is greatly accelerated and the polymerization temperature can be lowered below the melting point of the polymer. In this method the catalyst and activator are separately added to the molten lactam.

In this case the catalyst usually is present as a solid at room temperature, for example an alkali or alkaline earth-lactamate. Also, many of the activators (or co-catalysts), such as carbodiimide and blocked isocyanates, are solids. The disadvantage of the free isocyanates, many of which are liquids, is their high toxicity.

The anionic lactam polymerization and the activated anionic lactam polymerization, as well as all aspects of polyamide synthesis and the corresponding applications are described, for example, in the Plastics Manual, Volume VI, Polyamides, C. Hanser, publishers, München.

The activated anionic lactam polymerization is generally performed for producing so-called cast parts or semi-finished parts of large dimensions, such a profiles, preferably in accordance with the so-called 2-tank method.

Herein lactam melts of the same volume and containing the catalyst or the co-catalyst are produced, combined and intensely mixed. The polymerization is started by this and the melt can be processed immediately thereafter into finished parts, for example by means of the so-called monomer casting method.

In this process it is necessary to observe as much as possible that

- the lactam melts are free of water and oxygen,
- the mixing and processing steps take place in an inert gas, and
- the melts, in particular the catalyst-containing melts, have to be quickly used since they age rapidly.

So-called liquid catalyst systems were developed to ease the rapid and homogeneous distribution of the catalyst, for example magnesium or sodium lactamate, in the lactam melt.

Reference is made in German Patent Publication DE-22 30 732 C3 to the difficulties caused by the addition of catalysts in solid form, for example metallic lactamate, to the activator-containing lactam melt. An inhomogeneous polymer is created unless rapid dissolving and even distribution are assured.

To solve the problem, a solution of alkali lactamate in lactam, which is liquid at 90° C. and which additionally contains 0.3 to 5.0 weight-% of a low-volatile amine, is proposed by German Patent Publication DE-A-14 95 132.

A catalyst solution of metal lactamate in an N,N-disubstituted carbonamide, in particular in N-methylpyrrolidone, is described in U.S. Pat. No. 3,575, 938. The improved addition and distribution of this catalyst solution in an activated lactam melt also permits the production of mineral-filled parts.

In air, these catalyst solutions immediately turn to slag and are not liquid at room temperature. Therefore they have to be melted before use or conventionally dissolved in the lactam melt.

In accordance with the teachings of German Patent Publication DE 22 30 732 C3 it is necessary to prevent the crust formation, quickly exhibited by catalyst solutions made of alkali lactamate in 2-pyrrolidone and which interferes with the process, by the addition of higher alcohols. These solutions also solidify below 20° C.

Catalyst solutions with a high degree of stability when stored even at low temperatures are described in European Patent Publication EP 0 438 762 B1, which allow a rapid reaction and lead to polyamide with a relatively low amount of extractable contant. They consist of lactam, for example 2-pyrrolidone, special glycols, hydrocarbons and selectively contain amine. However, the low boiling points of the individual components of the solutions greatly limit the use.

However, in the cited prior art it is always necessary to use the activator and catalyst solutions separately.

Considerable process-technology-oriented disadvantages are connected with this. So, the activator must be added to the lactam melt in a prior step before the polymerisation can be started by the addition of the catalyst solution.

The essential disadvantages of the process in accordance with the prior art are the necessity of

- the separate addition of the activator and the catalyst solution to the lactam melt in discontinuous processes, or
- the use of two reservoirs, namely one for the activated and one for the catalyst-containing lactam melt, both of which have only a limited shelf life.

OBJECT AND SUMMARY OF THE INVENTION

It was therefore the object of the instant invention to overcome the disadvantages of the prior art by means of a suitable catalyst/activator system, which is liquid at room temperature and remains stable when stored, which by itself is capable of initiating the polymerization of the lactam, which makes short polymerization times possible and leads to polylactams of high quality.

This object is attained in particular by means of a liquid system which remains stable when stored, containing the activator and catalyst together and thereby makes the use of separate solutions of activator and catalyst unnecessary and which assures an essential increase in the applications of use, formulations and the processes.

It has been surprisingly found that compounds suitable as activator, such as isocyanates, in particular blocked by lactam, cabodiamides and oxazolines, in particular fatty alkyl bisoxazolines, are in the presence of catalysts and suitable solvents capable of forming systems that are liquid at room temperature and that are stable when stored in dry air.

Therefore the liquid system in accordance with the invention, which is to be added to a lactam melt free of water, essentially consists of a) at least one N-substituted urea compound, which can form a heterocyclic ring by means of its substituents R, R', R" and R''', as the base component and solvent, b) at least one alkali or alkaline-earth lactamate as the catalyst, c) at least one compound which activates the anionic lactam polymerization, d) at least one cyclic carboxylic acidamide wherein a, b, c and d add up to 100 parts by weight, and e) in addition, selectively process- or property-dependent additives, which do not or only very marginally hinder polymerization and are compatible with components a), b), and c).

N,N'-di-alkylated urea compounds a) are a part of the prior art.

Examples of such compounds are described in the BASF company publications "BASF-Zwischenprodukte" (BASF Intermediate Products] 1993.

Preferred N,N'-alkyl-substituted urea compounds are tetramethyl urea and tetrabutyl urea. Urea compounds of the formula II are particularly preferred

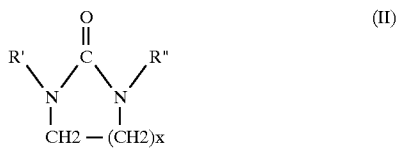

(II)

wherein x=1 to 8 and R' and R" are the same or different radicals with 1 to 12 C-atoms, which can also contain hetero atoms.

In this case N,N'-alkylated ureas where x=1 or 2 are particularly preferred.

Short-chain alkyl radicals with 1 to 8 C-atoms, and methyl radicals in particular, are preferred.

The fraction of the urea compound a) preferably is 30 to 70 parts by weight.

The fraction of the lactamate b) advantageously lies between 5 and 25 parts by weight, in this connection sodium lactamate and in particular sodium caprolactamate and sodium laurin lactamate are preferred as alkali lactamates, and magnesium lactamate, in particular magnesium caprolactamate and magnesium laurin lactamate, as alkali earth lactamates.

The production of the alkali and alkaline-earth lactamates is a part of the prior art and described by way of example in U.S. Pat. No. 3,575,938.

Sodium caprolactamate is a commercial product of Pacast AG, CH-7320 Sargans, and of L. Brüggemann, D-74076 Heilbronn.

Preferred activating compounds c) are blocked, in particular with lactams, such as caprolactam-blocked, mono-, di- and polyisocyanates, among them in particular diphenyl methane diisocyanate, hexamethylene diisocyanate, toluol diisocyanate, isophorone diisocyanate, m- and p-xylidene diisocyanate, or phenyl isocyanate, mono- or polycarbodiimide, such as, for example, N,N'- diisopropyl carbodiimide, N,N'-di-(o-tolyl)-carbodiimide, N,N'-dicyclohexyl carbodiimide, 2,2',6,6'-tetraisopropyl diphenyl carbodiimide and poly-(2,2-diisopropyl)-p-phenylene carbodiimide, as well as acylated lactams, among them in particular acetylated capro- and laurin lactamate, as well as oxazoline derivatives, oxazoline, oxazolone, N-substituted 2-oxazolidones, fatty alkyl oxazolines, hydroxy-fatty alkyl oxazolines, and oxazolines produced with hydroxy acids, such as ricinoleic acids, and their reaction products with isocyanates and diisocyanates.

These are described in Farben und Lacke 1993/11, pp 911 to 915.

The cyclic carboxylic acid amides are preferably lactams or alkylated lactams, N-acetyl aniline, N-acetyl piperidine or di-N-acetyl piperazine.

Selectively present additives e) with process- and use-dependent properties are known from the prior art:

Carboxylic acid ester, esters of acids of phosphorus, processing aids as well as di-N-alkylformamide or -acetamide or e1) additives which affect the properties of the polylactam, such as heat and light stabilizers, antioxidants, tracers, aromatics, dyes, pigments, optical brighteners, plasticizers and ejecting agents, e2) additives which directly affect the course of the polymerization, such as amines, alcohols and glykols. Their effects are described in U.S. Pat. No. 3,017,391.

Preferred liquid systems are:

System 1:

a) 45 to 70 percent by weight of an N,N'-methylated cyclic C2- or C3-alkylene-urea compound, b) 5 to 30 percent by weight alkali caprolactamate, c) 5 to 40 percent by weight lactam-blocked diisocyanate, d) 2 to 30 percent by weight caprolactam.

System 2:

a) 45 to 70 percent by weight of an N,N'-methylated cyclic C2- or C3-alkylene-urea compound, b) 5 to 40 percent by weight alkali caprolactamate, c) 10 to 40 percent by weight mono- or polycarbodiimide, d) 2 to 30 percent by weight caprolactam.

System 3:

a) 45 to 70 percent by weight of an N,N'-methylated cyclic C2- or C3-alkylene-urea compound, b) 5 to 40 percent by weight sodium caprolactamate, c) 10 to 40 percent by weight oxazoline compound, d) 2 to 30 percent by weight caprolactam.

The system in accordance with the invention is a homogeneous mixture with is liquid at room temperature and stable in inert gas or dry air, which can be rapidly and homogeneously distributed when added to a anhydrous lactam melt and thereby initiates the activated anionic lactam polymerization.

The invention also includes the use of the system in accordance with the invention for executing the anionic lactam polymerization. It is added to 100 part by weight of pure absolutely anhydrous lactam, selected from the group of caprolactam, enantholactam, laurinlactam and their mixtures preferably in amounts between 0.5 and 15 parts per weight. The polylactams, produced by the process, such as polycaprolactam, polyenantholactam or in particular polylaurinlactam is of good quality and with an excellent property profile which can be taylored.

The production of the liquid system in accordance with the invention will be explained below by way of examples.

DETAILED DESCRIPTION

EXAMPLES 1 TO 5

Examples 1 to 5 describe the production of liquid systems.

It is recommended to work in a protective gas atmosphere when producing the liquid system.

The component a) is placed into a vessel with an interior temperature measuring device and heated to 30° to 70° C.

Thereafter the component c) is added while stirring and is homogeneously mixed in. After a clear solution has formed, the component b) and subsequently the additives d), if required, are added while controlling the temperature, which must not exceed 70° C.

At room temperature, the resultant solutions are liquid and stable when stored.

TABLE 1

LIQUID SYSTEMS

| No. | Component a) | Parts a) | Component b) | Parts b) | Component c) | Parts e) | Component d) | Component e) | Parts e) | Remarks |
|-----|--------------|----------|--------------|----------|--------------|----------|--------------|--------------|----------|---------|
| 1 | DMI | 50 | Na-CL | 25 | CD | 25 | *) | — | — | orange-yellow, clear liquid |
| 2 | DMI | 60 | Na-LL | 20 | CD | 20 | *) | — | — | light red clear liquid |
| 3 | DMPU | 50 | Na-CL | 30 | CL-MDI | 20 | *) | — | — | yellow, clear liquid |
| 4 | DMPU | 48 | Na-CL | 19 | CL-MDI | 19 | *) | PA | 14 | yellow, clear liquid |
| 5 | DMPU | 30 | Na-CL | 35 | Bis-Ox | 35 | *) | — | — | yellow, clear liquid |

*) Lactam as apprx. 70 weight % portion from sodium caprolactamate or sodium laurin lactamate of component b)
DMPU: N,N'-dimethylpropylene urea
DMI: N,N'-dimethylethylene urea
Na-CL: Sodium caprolactamate in caprolactam, (apprx. 30 weight % sodium lactamate/apprx. 5% sodium content) Pacast AG, Sargans (CH)
Na-LL: Sodium laurin lactamate in laurinlactam, apprx. 30 weight % Na laurin lactamate
CL-MDI: Methylenediisocyanate blocked with caprolactam, Grilbond IL6 (R), Ems Chemie AG, Domat/Ems (CH)
Bis-Ox: Ricinyl bisoxazoline, Loxamid 8523 (R), Henkel KG, Düsseldorf (BRD)
CD: Bis-(2,6-diisopropylphenyl)carbodiimide, Stabilisator 7000 (R). Raschig AG, Ludwigshafen (D)
PA: Phenolic antioxidant, Irganox 1135, Ciba-Geigy AG, Basel (CH)

EXAMPLES 6 TO 10

To test the liquid systems for performing the activated anionic lactam polymerization, the following procedure is used:

A lactam melt is placed into a vessel with an interior temperature measuring device in a nitrogen atmosphere and the liquid system is introduced while the temperature is controlled and while stirring.

The period of time until the melt can no longer be stirred is used as the comparison time t for describing the course of the polymerization.

The melt is subsequently polymerized at 175° C. for 60 min.

TABLE 2

Use of the Liquid Systems of Examples 1 to 5 for Lactam Polymerization

| No | Lactam | Parts | System acc. to | Parts | Melt temperature | Comp. time t | DSC. Melt. Pt. of Polymer | Remarks |
|----|--------|-------|----------------|-------|------------------|--------------|---------------------------|---------|
| 6 | Laurinlactam | 100 | Example 1 | 3 | 175° C. | 80 sec | 175° C. | no discoloration |
| 7 | Laurinlactam | 100 | Example 2 | 3 | 175° C. | 60 sec | 172° C. | no discoloration |
| 8 | Laurinlactam | 100 | Example 3 | 3 | 175° C. | 22 sec | 172° C. | no discoloration |
| 9 | Laurinlactam | 100 | Example 4 | 3 | 175° C. | 90 sec | 170° C. | no discoloration |
| 10 | Laurinlactam | 100 | Example 5 | 3 | 175° C. | 10 sec | 171° C. | no discoloration |

EXAMPLES 11 to 15

As in Examples 1 to 5, further liquid systems were produced which contain non-cyclic urea compounds as component a).

Their composition can be seen in Table 3 and their polymerization behavior in Table 4.

To this end, the melt was polymerized at 200° C. and the time $t_u$ after which the melts could no longer be stirred was measured than polymerization was continued for another 20 minutes.

TABLE 3

LIQUID SYSTEMS with N-alkylated Non-cyclic Urea Compounds

| No. | Component a) | Parts a) | Component b) | Parts b) | Component c) | Parts c) | Component d) *) | Parts d) | Remarks |
|---|---|---|---|---|---|---|---|---|---|
| 11 | TBH | 30 | Na-CL | 20 | CD | 20 | NMP | 30 | clear liquid |
| 12 | TEH | 55 | Na-LL | 25 | CL-MDI | 20 | — | — | clear liquid |
| 13 | TMH | 40 | Na-CL | 20 | CL-MDI | 20 | NMP | 20 | clear liquid |
| 14 | TMH<br>TBH | 30<br>30 | Na-CL | 20 | Bis-Ox | 20 | | — | clear liquid |
| 15 | TMH<br>TBH | 20<br>20 | Na-CL | 20 | CD | 20 | NMP | 20 | clear liquid |

*) an additional part of component d) is the 70 weight % portion of caprolactam of component b).
TBH: Tetrabutyl urea BASF, Ludwigshafen (D)
THE: Tetraethyl urea Fluka AG, Buchs (CH)
TMH: Tetramethyl urea Fluka AG, Buchs (CH)
Na-CL: Sodium caprolactamate in caprolactam, sodium lactamate content 30 weight %, Pacast AG, Sargans (CH)
CD: Bis-(2,6-diisopropylphenyl)carbodiimide, Stabilisator 7000 ®, Raschig AG, Ludwigshafen (D)
CL-MDI: Methylenediisocyanate blocked with caprolactam, Grilbond IL6 ®, Ems Chemie Ag, Domat/Ems (CH)
Bis-Ox: Ricinyl bisoxazoline, Loxamid 8523 ®, Henkel KG, Düsseldorf (BRD)
NMP: N-methylpyrrolidone BASF, Ludwigshafen (D).

TABLE 4

Use of the Liquid Systems of Examples 11 to 15 for Lactam Polymerization

| No | Lactam | Parts | System Example | Parts | Melt-temperature °C. | time $t_u$ sec. | Melt pt. °C. | Relative Viskosity |
|---|---|---|---|---|---|---|---|---|
| 11 | LL | 100 | 11 | 3 | 200 | 200 | 173 | 3.05 |
| 12 | LL | 100 | 12 | 3 | 200 | 10 | 189 | nmb |
| 13 | LL | 100 | 13 | 3 | 200 | 8 | 166 | nmb |
| 14 | LL | 100 | 14 | 3 | 200 | 14 | 166 | 6.0 |
| 15 | LL | 100 | 15 | 3 | 200 | 200 | 172 | 2.90 |

$t_u$: Time until the melt can no longer be stirred
nmb: Viscosity can no longer be measured under actual conditions = very high viscosity
Smp °C.: DSC melting point of the polymers
Relative viscosity of the polymer: 0.5% in m-cresol

What is claimed is:

1. A liquid system for performing anionic lactam polymerization, comprising:
   a) 20 to 80 parts by weight of at least one N-substituted urea compound of the formula I

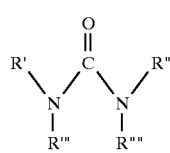

wherein R' and R" are the same or different alkyl radicals with up to 12 C atoms, which can also contain hetero atoms, and R''' and R"" are the same or different alkyl radicals with up to 8 C-atoms, b) 5 to 40 parts by weight of at least one catalyst selected from the group consisting of alkali lactamates and alkaline earth lactamates,
   c) 10 to 40 parts by weight of at least one compound which activates the anionic lactam polymerization selected from the group consisting of lactam-blocked mono- and polyisocyanates, carbodiimides, polycarbodiimides, N-acylated carbonamide compounds and oxazoline compounds,
   d) 2 to 30 parts by weight of at least one cyclic carboxylic acid amide, wherein the proportions a), b), c) and d) add up to 100 parts by weight, and
   e) optionally property- or application-dependent additives.

2. A liquid system for performing anionic lactam polymerization, comprising:
   a) 20 to 80 parts by weight of at least one N-substituted urea compound of the formula II

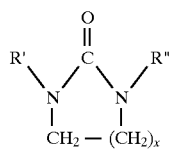

wherein R' and R" are the same or different alkyl radicals with up to 12 carbon atoms, and x is an integer of 1 to 8, b) 5 to 40 parts by weight of at least one catalyst selected from the group consisting of alkali lactamates and alkaline earth lactamates, c) 10 to 40 parts by weight of at least one activator compound which activates the anionic lactam polymerization, d) 2 to 30 parts by weight of at least one cyclic carboxylic acid amide, wherein the proportions a), b), c) and d) add up to 100 parts by weight, and e) optionally property- or application-dependent additives.

3. The liquid system in accordance with claim 1, characterized in that the fraction of the urea compound a) is 30 to 70 parts by weight.

4. The liquid system in accordance with claim 1, characterized in that the fraction of the alkali or alkaline earth lactamate b) is 5 to 25 parts by weight.

5. The liquid system in accordance with claim 1, characterized in that the catalyst b) is a sodium lactamate.

6. The liquid system in accordance with claim 5, characterized in that the sodium lactamate is sodium caprolactamate or sodium laurin lactamate.

7. The liquid system in accordance with claim 1, characterized in that the catalyst b) is a magnesium lactamate.

8. The liquid system in accordance with claim 7, characterized in that the magnesium lactamate is magnesium caprolactamate or magnesium laurin lactamate.

9. The liquid system in accordance with claim 1, characterized in that the compound c) is an oxazoline selected from the group consisting of oxazoline derivatives, oxazoline, oxazolone, N-substituted N-2- oxazolidone, fatty alkyl oxazoline, and oxazolines produced by means of hydroxy acids and their reaction products with isocyanates.

10. The liquid system in accordance with claim 1, characterized in that the cyclic carbonamide compound is selected from the group consisting of butyrolactam, valero-lactam, caprolactam, enantholactam and laurinlactam, C1 to C12 alkylated butyro-, valero-, capro-, enantho- and laurinlactam, N-acetyl aniline, N-acetyl piperidine, and diacylated piperazine and their mixtures.

11. The liquid system in accordance with claim 1, characterized in that at least one additive d) is present and selected from the group consisting of amines, polyamines, low volatile alcohols, glycols, carboxylic acid esters, esters of acids of phosphorus, light stabilizers, heat stabilizers, optical brighteners, plasticizers, tracers, aromatics and processing aids.

12. The liquid system in accordance with claim 1, composed of a) 45 to 70 percent by weight of an N,N'-methylated cyclic C2- or C3-alkylene-urea compound, b) 5 to 30 percent by weight alkali caprolactamate, c) 5 to 40 percent by weight lactam-blocked diisocyanate, d) 2 to 30 percent by weight caprolactam.

13. The liquid system in accordance with claim 1, consisting essentially of a) 45 to 70 percent by weight of an N,N'-methylated cyclic C2- or C3-alkylene-urea compound, b) 5 to 40 percent by weight alkali caprolactamate, c) 10 to 40 percent by weight mono- or polycarbodiimide, d) 2 to 30 percent by weight caprolactam.

14. The liquid system in accordance with claim 1, consisting essentially of a) 45 to 70 percent by weight of an N,N'-methylated cyclic C2- or C3-alkylene-urea compound, b) 5 to 40 percent by weight sodium caprolactamate, c) 10 to 40 percent by weight oxazoline compound, d) 2 to 30 percent by weight caprolactam.

15. The liquid system in accordance with claim 2, characterized in that in the N-substituted urea compound a) of Formula II, x=1 or 2.

16. The liquid system in accordance with claim 15, characterized in that the catalyst b) is a sodium lactamate.

17. The liquid system in accordance with claim 16, characterized in that the activating compound c) is selected from the group consisting of lacam-blocked mono- and polyisocyanate, carbodiimide, polycarbodiimide, N-acylated carbonamide compound and oxazoline compound.

18. The liquid system in accordance with claim 17, characterized in that the cyclic carbonamide compound is selected from the group consisting of butyrolactam, valerolactam, capralactam, enantholactam and laurinlactam, C1 to C12 alkylated butyro-, valero-, capro-, enanto- and laurinlactam, N-acetyl aniline, N-acetyl piperidine, and diacylated piperazine and their mixtures.

19. A method for executing the anionic polymerization of a lactam, comprising mixing 0.5 to 10 parts of a liquid system according to claim 1 with a melt of said lactam, and polymerizing said lactam.

20. A method for executing the anionic polymerization of a lactam, comprising mixing 0.5 to 10 parts of a liquid system according to claim 2 with 100 parts of said lactam, and polymerizing said lactam.

21. A method according to claim 20 wherein said lactam is selected from the group consisting of caprolactam, enantholactam, laurinlactam and mixtures thereof.

22. A method according to claim 19 wherein said lactam is selected from the group consisting of caprolactam, enantholactam, laurinlactam and mixtures thereof.

23. The liquid system in accordance with claim 2, wherein the fraction of the urea compound a) is 30 to 70 parts by weight.

24. The liquid system in accordance with claim 2, wherein the fraction of the alkali or alkaline earth lactamate b) is 5 to 25 parts by weight.

25. The liquid system in accordance with claim 16, wherein the sodium lactamate is sodium caprolactamate or sodium laurinlactamate.

26. The liquid system in accordance with claim 2, wherein the catalyst b) is a magnesium lactamate.

27. The liquid system in accordance with claim 26, wherein the magnesium lactamate is magnesium caprolactamate or magnesium laurinlactamate.

28. The liquid system in accordance with claim 17, wherein the compound c) is an oxazoline selected from the group consisting of oxazoline derivatives, oxazoline, oxazolone, N-substituted N-2-oxazolidone, fatty alkyl oxazoline, and oxazolines produced by means of hydroxy acids and their reaction products with isocyanates.

29. The liquid system in accordance with claim 2, wherein the compound c) is a cyclic carbonamide selected from the group consisting of butyrolactam, valerolactam, caprolactam, enantholactam and laurinlactam, C1 to C12 alkylated butyro-, valero-, capro-, enantho- and laurinlactam, N-acetyl aniline, N-acetyl piperidine, and diacylated piperazine and their mixtures.

30. The liquid system in accordance with claim 1, wherein said N-substituted urea compound a) is selected from the group consisting of tetrabutyl urea, tetraethyl urea and tetramethyl urea.

* * * * *

UNITED STATES PATENT AND TRADEMARK OFFICE
CERTIFICATE OF CORRECTION

PATENT NO. : 5,864,007
DATED : Jan. 26, 1999
INVENTOR(S) : Schmid et al.

It is certified that error appears in the above-identified patent and that said Letters Patent is hereby corrected as shown below:

On the title page, column 1, Item [75], delete "Valbeuna" and insert therefor --Bonaduz--.

Signed and Sealed this

Fifteenth Day of June, 1999

Attest:

Q. TODD DICKINSON

Attesting Officer

Acting Commissioner of Patents and Trademarks